United States Patent Office 3,839,589
Patented Oct. 1, 1974

3,839,589
FLUOROCYCLOPROPANE ANESTHETICS
Gerald Joseph O'Neill, Arlington, Charles William Simons, Bedford, and Charles A. Billings, Concord, Mass., assignors to W. R. Grace & Co., Cambridge, Mass.
No Drawing. Continuation-in-part of abandoned applications Ser. No. 259,086, June 2, 1972, and Ser. No. 370,264, June 15, 1973. This application Sept. 7, 1973, Ser. No. 395,303
Int. Cl. A61k 27/00
U.S. Cl. 424—352                    4 Claims

ABSTRACT OF THE DISCLOSURE

The following fluorocyclopropanes have been found useful as general inhalation anesthetics: 1-chloro-1,2,2,-trifluorocyclopropane, 1-bromo-2,2-difluorocyclopropane and 1,1-dibromo-2,2-difluorocyclopropane.

CROSS-REFERENCE TO RELATED APPLICATIONS

This application is a continuation of applications 259,086 filed on June 2, 1972 and 370,264 filed on June 15, 1973. Application 370,264 is in turn a division of 258,957 filed on June 2, 1972; it was filed to separate the anesthetic process invention from the chemical invention originally disclosed.

Applications S.N. 259,086 and 370,264 are now abandoned.

THE PRIOR ART

Although a certain number of halogenated hydrocarbon compounds have joined the ranks of useful anesthetics in the recent past, little has been added to the understanding of the mode of action of chemical compounds in this physiological role, and the relationships of the differences between fairly closely similar compounds with either their toxic or therapeutic properties remain substantially unidentified. In view of this situation, the discovery of additional substances possessing a desirable combination of properties for anesthetic purposes still lies beyond the scope of routine expertise.

SUMMARY OF THE INVENTION

It has now been discovered that 1-chloro-1,2,2-trifluorocyclopropane, 1-bromo-2,2-difluorocyclopropane and 1,1-dibromo-2,2-difluorocyclopropane possess high potency as general anesthetics when administered to inhalation anesthetic-susceptible organism.

DETAILED DESCRIPTION

The compounds of this invention can be prepared by the reaction of an appropriate halocarbene with an olefin according to the method of P.B. Sargent [J. Org. Chem. *35* (3), 678-682 (1970)]. The carbene is generated in the presence of the olefin by the thermal decomposition of either the corresponding phenyl (trihalomethyl)-mercury compound, according to the method of D. Seyferth et al. [J. Am. Chem. Soc. *87*, 4259–70 (1965)], or hexafluoropropylene oxide, a compound that can be synthesized with relative ease [J. Org. Chem. *31* 2312 (1966)]. The cyclization reaction may be illustrated as follows:

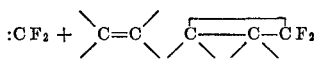

It should be noted that this method of synthesis does not always yield the compound desired possibly because, in some instances, either the cyclization does not take place or, if it does, the resulting cyclocompound is unstable at carbene generating temperatures.

Example 1

To prepare the chlorocyclopropane compound of the present invention, 4-t-butylpyrocatechol, 1 part by weight, is placed in stainless steel autoclave. The autoclave is sealed, evacuated, and cooled to —78° C. 1-chloro-1-fluoroethylene, 80.5 parts, and hexafluoropropylene oxide, 40.3 parts, are then introduced into the apparatus. The system is heated for 8 hours at 185° C. After cooling to room temperature, the contents of the autoclave are transferred to a —196° C. trap. Materials boiling below room temperature are allowed to escape and the residue is purified by preparative vapor chromatography. The product has a molecular weight of 130, a boiling point of 31° C. and a $d_4^{20}$ of 1.358 g./ml.

Example 2

To obtain the monobromocyclopropane compound, 4-*t*-butylpyrocatechol, 1 part by weight, is placed in a stainless steel autoclave. The autoclave is sealed, evacuated, and cooled to —78° C. 1-vinyl bromide, 116.2 parts, and hexafluoropropylene oxide, 46.4 parts, are then introduced into the apparatus. The system is heated for 8 hours at 185° C. After cooling to room temperature, the contents of the autoclave are transferred to a —196° C. trap. Materials boiling below room temperature are allowed to escape and the residue is purified by preparative vapor chromatography. The product has a molecular weight of 157, a boiling point of 68 to 68.5° C. and a $d_4^{20}$ of 1.725 g./ml.

Example 3

The dibromo compound can be prepared as follows: A stainless steel magnetic-drive packless autoclave is charged with phenyl (tribromomethyl)mercury, 30 parts by weight. The autoclave is sealed, evacuated, and benzene, 66 parts, is drawn in. The autoclave is then pressurized to 225 p.s.i. with vinylidene fluoride, in this instance 43 parts by weight. The sealed autoclave is then heated to 80 to 90° C. for 24 hours. The reaction mixture is cooled to room temperature and the volatiles are vented to the atmosphere. The remaining liquid, which contains the cyclopropane, is first purified on an auto annular Teflon spinning band column followed by preparative vapor phase chromatography. The product has a molecular weight of 236, a boiling point of 110–111° C. and a $d_4^{20}$ of 2.147 g./ml.

Example 4

The physiological effects of the three fluorocyclopropanes were demonstrated as follows, using a standard test for evaluation of inhalation anesthetics similar to that described by Robbins [J. Pharmacology and Experimental Therapeutics *86*, 197 (1946)].

Mice were exposed to the anesthetic for a period of 10 minutes in a rotating drum. Observations were then made of the pinch reflex, the corneal reflex and the return of the righting reflex. At least four graded doses were employed to determine the minimum concentration required to anesthetize 50% of the mice used ($AC_{50}$) and the minimum concentration required to kill 50% of the mice ($LC_{50}$). The anesthetic index (AI) was then calculated from these minimum concentrations. The results of these tests are summarized in the following table.

ANESTHETIC PROPERTIES

| Cyclopropane | Percent volume | | A.I. ($AC_{50}/LC_{50}$) |
|---|---|---|---|
| | $AC_{50}$ | $LC_{50}$ | |
| 1-chloro-1,2,2-trifluoro- | 4 | >8 | >2 |
| 1-bromo-2,2-difluoro- | <1.5 | 4 | *2–3 |
| 1,1-dibromo-2,2-difluoro- | 0.25 | 3 | 12 |

* When two figures are given, the actual value of the anesthetic index lies between these two figures.

For comparison, keeping in mind that other differences in properties also exist, it may be considered that the widely used 1,1,1-trifluoro-2-bromo-2-chloroethane (halothane) showed an anesthetic index of about 3.2 when tested under the same conditions.

What is claimed is:

1. The process of inducing anesthesia in a mammal which comprises administering to said mammal by inhalation an effective quantity for inducing anesthesia of a cyclopropane selected from the group consisting of 1-chloro-1,2,2-trifluorocyclopropane, 1-bromo-2,2-difluorocyclopropane and 1,1-dibromo-2,2-difluorocyclopropane.

2. The process of Claim 1 wherein the cyclopropane used is 1-chloro-1,2,2-trifluorocyclopropane.

3. The process of Claim 2 wherein the cyclopropane used is 1-bromo-2,2-difluorocyclopropane.

4. The process of Claim 1 wherein the cyclopropane used is 1,1-dibromo-2,2-difluorocyclopropane.

References Cited

UNITED STATES PATENTS 3,349,136  10/1967  Boudakian _____ 260—648

OTHER REFERENCES

Larsen, Fluorine Chemistry Review, vol. 3, 1969, page 35.

JEROME D. GOLDBERG, Primary Examiner